UNITED STATES PATENT OFFICE.

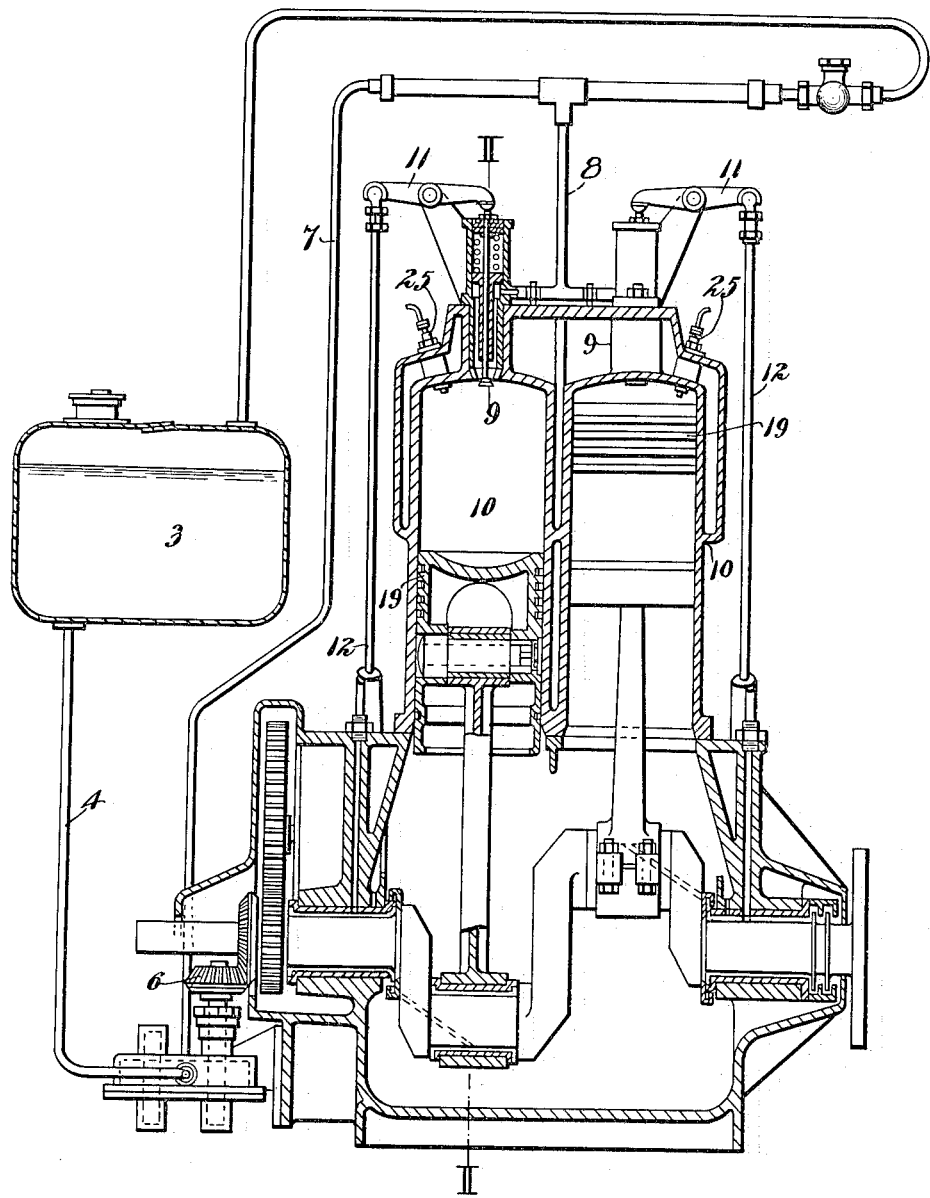

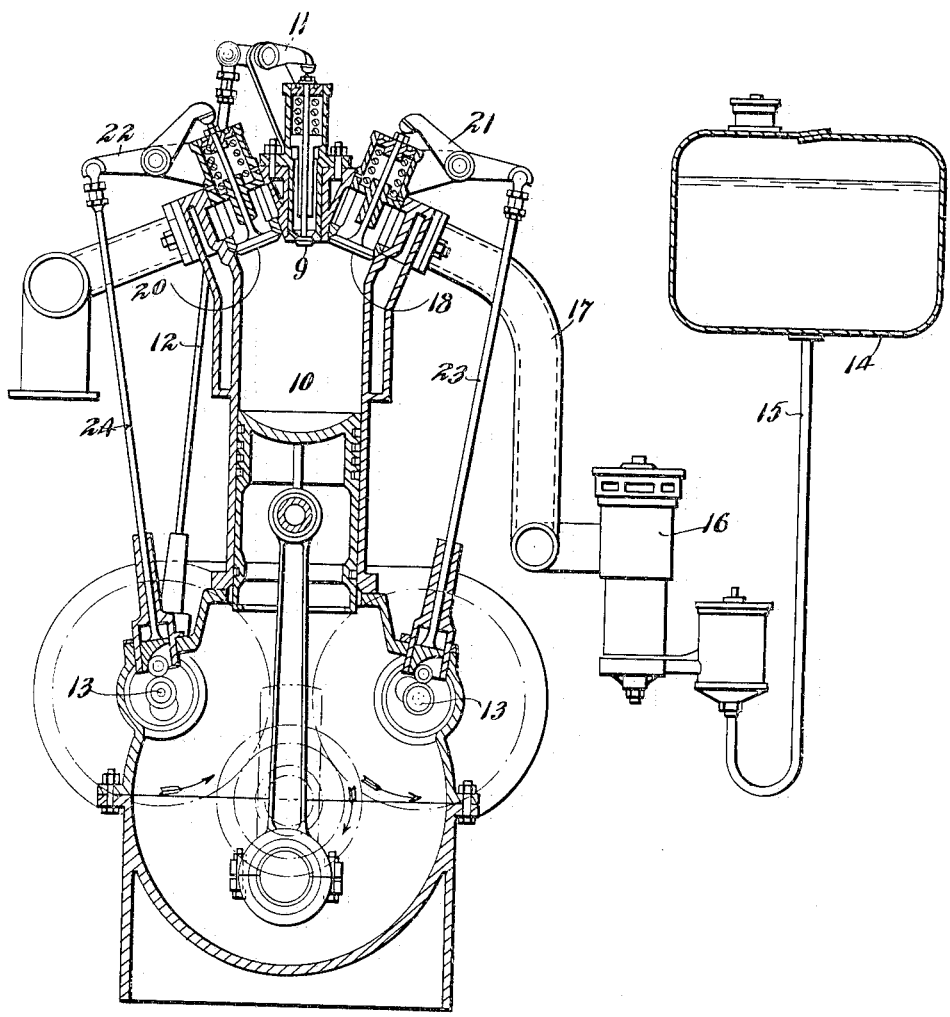

ALBERT SCHMID, OF HAVRE, FRANCE.

INTERNAL-COMBUSTION ENGINE.

1,121,135.   Specification of Letters Patent.   Patented Dec. 15, 1914.

Application filed August 15, 1911. Serial No. 644,108.

*To all whom it may concern:*

Be it known that I, ALBERT SCHMID, a citizen of the United States, and a resident of Havre, in the Republic of France, have invented a new and useful Improvement in Internal-Combustion Engines, of which the following is a specification.

The invention, which constitutes the subject matter of this application relates to an internal combustion engine and the method of operating the same, and has to do with that type of engine which is designed to use comparatively heavy, not readily inflammable, liquid fuel.

The object of the invention is to provide an engine of the above character and a method of operating the same at high speeds, said engine being flexible as regards speed and torque characteristics, light in weight, and of simple and cheap construction.

A further object of the invention is to provide an engine of the above kind which may be readily started without complicated and expensive auxiliary starting apparatus.

In one well known type of internal combustion engine using a heavy grade of liquid fuel, the compression of the air in the cylinder is carried to a very high point in order to obtain the heat necessary for the ignition of the fuel. A compression as high as 600 lbs. to the square inch is quite usual in engines of this character, and owing to this high compression the construction of the engine and the weight of the reciprocating parts must be very heavy with the result that such engines are not adapted to be run at high speeds nor are they very flexible as regards variation in speed. Further disadvantages are experienced with this type of engine due to the auxiliary apparatus required for starting and operating the same.

Another well known type of internal combustion engine also using heavy liquid fuel but a less degree of compression has the disadvantage of being difficult to start owing to the combustion chamber or carbureter having to be initially heated by some auxiliary means. This type of engine is not flexible as regards speed and torque characteristics, as at slow speeds the combustion chamber or carbureter frequently becomes insufficiently heated to secure the proper ignition and combustion of the explosive mixture.

According to the present invention in addition to the heavy not readily inflammable liquid fuel injected into the cylinder, which produces the greater part of the power ordinarily developed by the engine, a mixture of light easily inflammable liquid fuel with an excess of air is admitted to the cylinder through a carbureter. The ignition and combustion of the total charge in the cylinder is in this way readily obtained without carrying the compression in the cylinder beyond a moderate degree and the necessity for initially heating a part of the combustion chamber or carbureter and maintaining the same hot whilst the engine is running, is avoided. The total weight of the engine may thus be kept low as the parts do not have to withstand a high compression and auxiliary starting apparatus is not required, the engine being readily started on the light fuel only in a similar way to the ordinary petrol motor. Great flexibility as regards speed is attained as at light or no load the engine may be run at a low speed on the light fuel only.

The proportions which the two qualities of fuel used bear to one another will depend upon a variety of circumstances and must be modified and adjusted until the best effect is secured. It will generally be found desirable, however, to use no more of the light readily inflammable fuel than will secure proper ignition of the mixture in the cylinder.

The fuel admission devices are so arranged that the light fuel and air is introduced into the cylinder during the suction or equivalent stroke of the engine, and the heavy fuel is injected or sprayed into the cylinder either before, at the same time as, or subsequent to the mixture of light fuel and air. In any case the injection of the heavy fuel is arranged to take place before the ignition of the charge of light fuel and air and preferably during the suction stroke of the piston or during the early part of the compression stroke thereof in order to avoid the necessity of injecting the liquid fuel into the cylinder when any considerable pressure exists therein.

At starting or when the engine is running at low loads means are provided whereby the supply of heavy liquid fuel to the cylinder may be cut off. Such means may for example consist of a suitable valve located at a convenient point in the fuel supply system or the actuating mechanism for the fuel admission device may be thrown out of operation in any well known way.

In order that the nature of the invention may be clearly understood it will now be described with reference to the accompanying drawings which show, by way of example only, an engine arranged to operate in accordance with the invention, Figure 1 being a vertical longitudinal section and Fig. 2 a vertical cross section on the line II—II of Fig. 1.

The heavy not readily inflammable liquid fuel (crude petroleum for example) is led from a receptacle 3 through a pipe 4 to a pump 5 driven by gearing 6 from the shaft of the engine by means of which it is forced through pipes 7 and 8 and inlet valves 9, 9 into the cylinders 10. The inlet valves 9, are arranged to be operated at the proper times through levers 11, rods 12 and cams (not shown) on the cam shaft 13 in the well known way. The light easily inflammable liquid fuel (petrol for example) is led from another receptacle 14 through a pipe 15 to a suitable carbureter 16 and is drawn through pipe 17 past the inlet valve 18 by the suction stroke of the piston 19 in the usual way. The amount of air contained in the mixture drawn into the cylinder through the carbureter 16 is preferably largely in excess of the quantity necessary for the combustion of the light liquid fuel contained in this mixture. The inlet valve 18 and the exhaust valve 20 are respectively operated by levers 21, 22 and rods 23, 24 from the cam shafts 13 in the well known way. Each of the cylinders 10 is provided with similar inlet and exhaust valves so that both of them may be supplied with explosive mixture from the carbureter 16.

25, 25 indicate electrical igniting devices of any suitable character.

The operation is as follows:—A charge of light, liquid fuel mixed with air is drawn from the carbureter 16 through the inlet valve 18 into the cylinder 10 by the suction stroke of the piston 19 which latter on its return stroke compresses the mixture which is then ignited by the device 25. The combustion of this mixture furnishes the heat necessary for the ignition of the heavy liquid fuel which has been injected into the cylinder through the inlet valve 9 by the pump 5 either before, at the same time as, or subsequent to the charge of light fuel and air and preferably either during the suction or early part of the compression stroke of the piston. On the return stroke of the piston the products of combustion are discharged from the cylinder through the exhaust valve 20 and the operation above described is repeated.

A two-cylinder engine working on the four-stroke cycle with mechanically operated inlet and exhaust valves of the puppet type and electrical ignition has been described by way of example only and it is to be understood that the invention is not limited in its application to any particular type of internal combustion engine as several known types of such engines may be adapted thereto. For instance the engine may have one or a plurality of cylinders and may be arranged to operate on the two or on the four stroke cycle and the heavy fuel and light liquid fuel mixed with air may be admitted to the cylinder by other means than the mechanically operated inlet valves shown and described herein, also any method of ignition may be employed for the charge of air and light combustible liquid fuel. The engine may be governed in various ways by varying the amount of heavy liquid fuel injected or sprayed into the cylinder or by variation in the amount or proportions of the charge of air and light combustible liquid admitted to the cylinder or by varying the moment of ignition of the latter or by two or more of these methods in combination.

Owing to the comparatively low compression in the cylinder of an engine operated in accordance with the present invention, the reciprocating and other parts of the engine can be made comparatively light with the result that the engine may be operated at high speeds, and is very flexible as regards speed and torque characteristics. Further, the employment of an explosive mixture consisting of air and a light easily inflammable liquid fuel with the consequent reduction in the degree of compression necessary in the cylinder, enables engines operated in accordance with this invention, particularly those of comparatively small size, to be started without the use of air pumps or other auxiliary starting means but in engines of large size it may be found desirable to use compressed air or other additional starting apparatus in the well known way. Another advantage possessed by engines operated in accordance with this invention is that they may be readily made reversible.

Although not limited in this respect engines arranged to operate in accordance with this invention are especially suitable for purposes of transport, such as the propulsion of automobiles, commercial motor vehicles, ships, boats, and so forth as such engines are of comparatively light weight, are simple in construction and readily started, have a very wide range of speed and are economical as regards fuel consumption.

I claim as my invention:

1. The method of operating an internal combustion engine by two kinds of fuel, one of which is a light easily inflammable liquid fuel and the other of which is a heavy not easily inflammable liquid fuel, by causing the light easily inflammable liquid fuel together with a volume of air in excess of that necessary for its combustion to be drawn into the engine cylinder through a carbureter during the suction stroke of the engine, and the heavy not easily inflammable liquid fuel to be sprayed directly into the engine cylinder between the beginning of the suction and completion of compression but prior to ignition.

2. In combination with an internal combustion engine, a supply of light easily inflammable liquid fuel, means between said supply and the engine cylinder adjusted to deliver to the cylinder a charge of such fuel mixed with a volume of air in excess of that necessary for its combustion, an ignition device for said charge, a supply of comparatively heavy not easily inflammable liquid fuel, and means for spraying such fuel directly into the engine cylinder between the beginning of the suction and the completion of compression and before ignition.

In witness whereof, I have hereunto subscribed my name this 3rd day of August 1911.

ALBERT SCHMID.

Witnesses:
CONSTANT GUÉRARD,
FERNAND CARDIF.